United States Patent
Ko et al.

(10) Patent No.: US 9,361,020 B2
(45) Date of Patent: Jun. 7, 2016

(54) METHOD AND APPARATUS FOR DISPLAYING E-BOOK IN TERMINAL HAVING FUNCTION OF E-BOOK READER

(71) Applicant: Samsung Electronics Co., Ltd., Gyeonggi-do (KR)

(72) Inventors: Daehyun Ko, Seoul (KR); Kangsu Park, Gyeonggi-do (KR); Heeseon Park, Seoul (KR); Sunghyun Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 531 days.

(21) Appl. No.: 13/660,454

(22) Filed: Oct. 25, 2012

(65) Prior Publication Data

US 2013/0104017 A1   Apr. 25, 2013

Related U.S. Application Data

(60) Provisional application No. 61/551,144, filed on Oct. 25, 2011.

(30) Foreign Application Priority Data

Nov. 29, 2011   (KR) .................. 10-2011-0125651

(51) Int. Cl.
  *G06F 17/00*   (2006.01)
  *G06F 3/0488*   (2013.01)
  *G06F 3/0483*   (2013.01)
  *G06F 3/0485*   (2013.01)

(52) U.S. Cl.
  CPC .......... *G06F 3/04883* (2013.01); *G06F 3/0483* (2013.01); *G06F 3/0485* (2013.01)

(58) Field of Classification Search
  CPC ..................................................... G06F 17/212
  USPC ............................................................ 715/273
  See application file for complete search history.

(56) References Cited

U.S. PATENT DOCUMENTS

| | | | |
|---|---|---|---|
| 5,550,925 A * | 8/1996 | Hori | H03G 5/165 381/98 |
| 6,115,724 A | 9/2000 | Booker | |
| 7,171,630 B2 * | 1/2007 | O'Leary et al. | 715/856 |
| 7,240,291 B2 | 7/2007 | Card et al. | |
| 7,898,541 B2 | 3/2011 | Hong et al. | |
| 8,150,669 B2 * | 4/2012 | Cacas | G01V 99/00 345/423 |

(Continued)

FOREIGN PATENT DOCUMENTS

JP   2002215285   7/2002

OTHER PUBLICATIONS

Liesaputra et al., Seeking Information in Realistic Books: A User Study, ACM 2008, pp. 29-38.*

(Continued)

*Primary Examiner* — Cong-Lac Huynh
(74) *Attorney, Agent, or Firm* — The Farrell Law Firm, P.C.

(57) ABSTRACT

A method and an apparatus that can display a page of an e-book according to user input information about reading of the e-book are provided. The includes displaying an opened page of the e-book; detecting a pointing position indicated by a pointer and an amount of position variation of the pointer with respect to the opened page; modifying the opened page based on the pointing position and the detected amount of position variation; and displaying a modified page.

20 Claims, 11 Drawing Sheets

(a)

(b)

(56) References Cited

U.S. PATENT DOCUMENTS

| | | | |
|---|---|---|---|
| 8,826,036 B1* | 9/2014 | Snodgrass et al. | 713/189 |
| 9,046,957 B2* | 6/2015 | Lee | G06F 3/0414 |
| 2002/0035697 A1* | 3/2002 | McCurdy et al. | 713/200 |
| 2005/0134606 A1* | 6/2005 | Hong et al. | 345/619 |
| 2006/0133664 A1* | 6/2006 | Hong et al. | 382/154 |
| 2007/0048717 A1* | 3/2007 | Hsieh | 434/317 |
| 2007/0237136 A1* | 10/2007 | Sako et al. | 370/368 |
| 2008/0294759 A1* | 11/2008 | Biswas et al. | 709/222 |
| 2012/0047470 A1* | 2/2012 | Martinoli | 715/863 |
| 2012/0084646 A1* | 4/2012 | Homma et al. | 715/273 |
| 2012/0176385 A1* | 7/2012 | Gunji et al. | 345/441 |
| 2013/0069984 A1* | 3/2013 | Chuang et al. | 345/629 |
| 2013/0159914 A1* | 6/2013 | Grigoryev et al. | 715/776 |
| 2013/0229371 A1* | 9/2013 | Lee et al. | 345/173 |
| 2013/0268847 A1* | 10/2013 | Kim | G06F 3/0483 715/251 |
| 2013/0268858 A1* | 10/2013 | Kim et al. | 715/716 |

OTHER PUBLICATIONS

Liesaputra et al.k, Computer Graphics Techniques for Modeling Page Turning, Springer 2009, pp. 93-121.*

Nedel et al., Real Time Muscle Deformation Using Mass-Spring Systems, Google 1998, pp. 1-10.*

Misra et al., Microphone as Sensor in Mobile Phone Performance, Google 2008, pp. 1-4.*

Hong et al., Turning Pages of 3D Electronic Books, IEEE 2006, pp. 1-8.*

* cited by examiner

FIG. 3
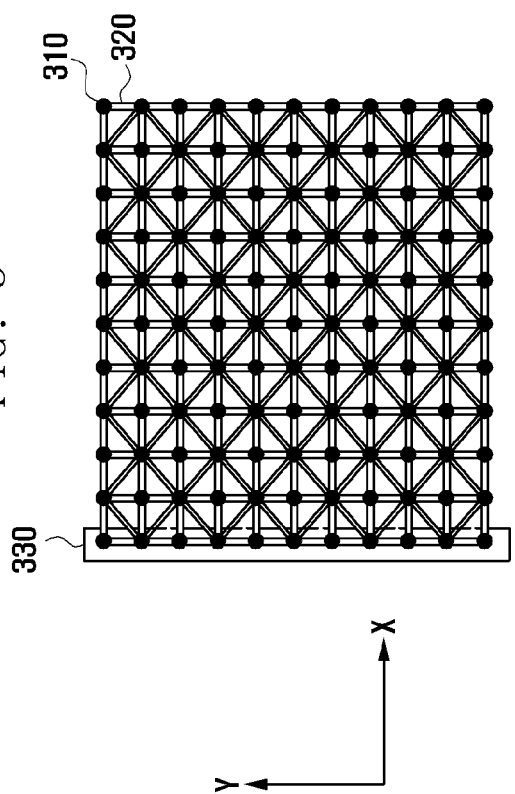
[a]
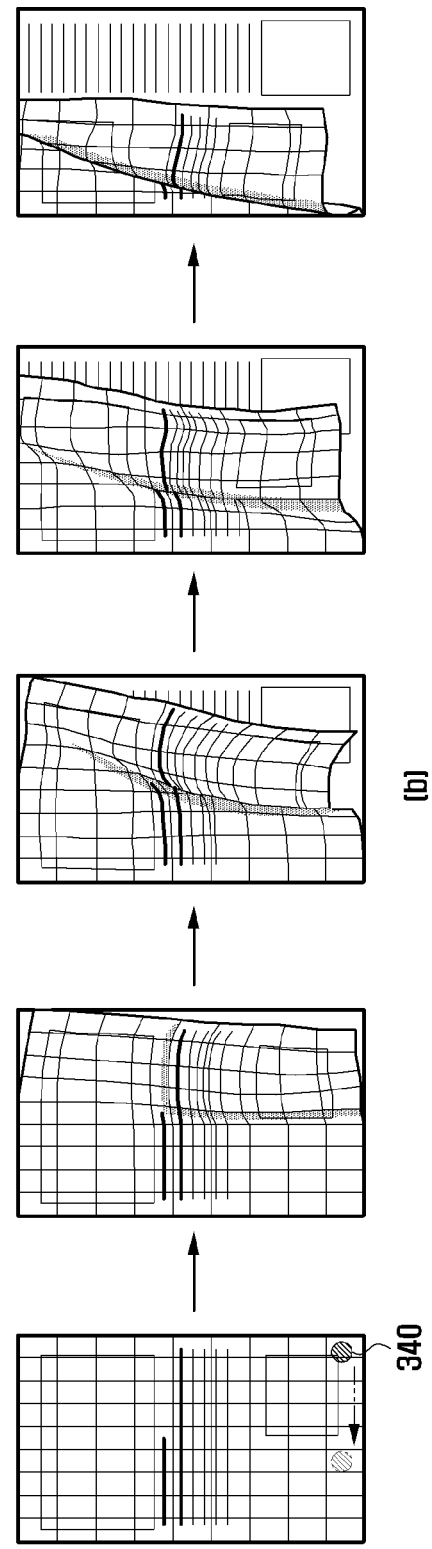
[b]

FIG. 11
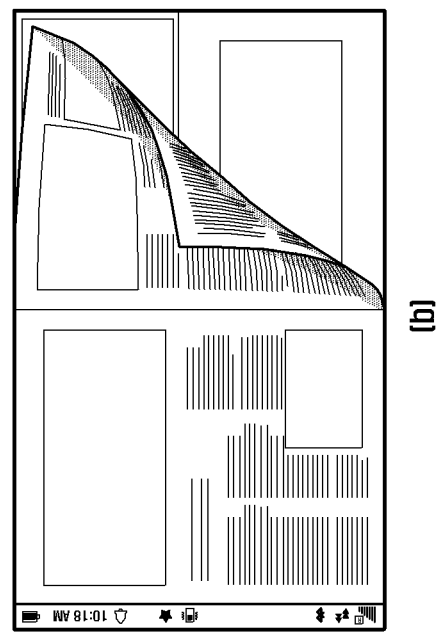
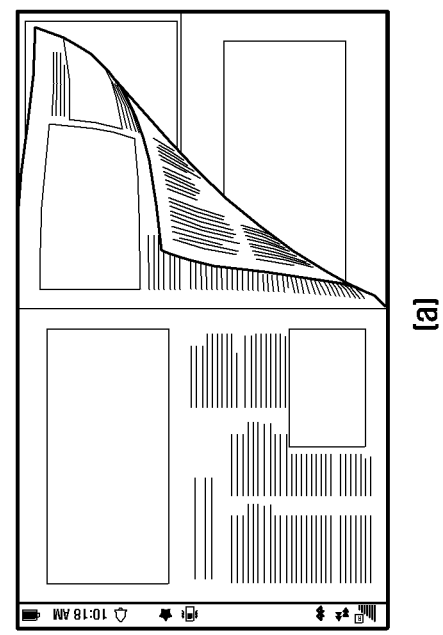

METHOD AND APPARATUS FOR DISPLAYING E-BOOK IN TERMINAL HAVING FUNCTION OF E-BOOK READER

PRIORITY

This application claims priority under 35 U.S.C. §119 to Korean Patent Application No. 10-2011-0125651, filed on Nov. 29, 2011 in the Korean Intellectual Property Office, and U.S. Provisional Application No. 61/551,144, filed on Oct. 25, 2011 in the United States Patent and Trademark Office, the entire disclosure of each of which is incorporated herein by reference.

BACKGROUND OF THE INVENTION

1. Field of the Invention

The present invention relates generally to a method and an apparatus for displaying an electronic book (e-book) in a terminal having a function of an e-book reader, and more particularly, to a method and an apparatus for displaying a page of an e-book according to user input information regarding the user's reading of the e-book.

2. Description of the Related Art

Generally, a terminal displays a page of an e-book according to information input by a user. However, the terminal provides a very simple method and apparatus for displaying an e-book. That is, according to the conventional methods and apparatuses for displaying an e-book, it is difficult to give a user a sense that manipulating an e-book is similar to manipulating a real paper book.

For example, when detecting user input information about turning pages, the conventional method and apparatuses for displaying an e-book immediately change from a currently displaying page to another page, or scroll a current page in a direction corresponding to the input information to change from the current page to another page. That is, this changing scheme is not really similar to turning a paper page, but is more like browsing a Web page.

A recent terminal increasingly includes a pointing apparatus and particularly, a touchscreen as an input unit. Thus, the terminal detects a touchscreen while displaying an arbitrary page, and displays a page of an e-book according to the detected touch gesture. That is, in a terminal to which a touchscreen is applied, a method and an apparatus for displaying an e-book provide an animation of turning a page. However, an animation provided from such a terminal does not give the sense that the user to turning real paper pages. That is, it does not provide a representation of real paper, and only uniformly provides the shape of turning a page. That is, all page turns look the same.

SUMMARY OF THE INVENTION

The present invention has been made in view of the above and other problems, and provides at least the advantages described below.

An aspect of the present invention is to provide a method and apparatus for displaying an e-book providing a more realistic reading experience.

In accordance with an aspect of the present invention, a method of displaying an electronic book (e-book) in a terminal including an e-book reader is provided. The method includes The includes displaying an opened page of the e-book; detecting a pointing position indicated by a pointer and an amount of position variation of the pointer with respect to the opened page; modifying the opened page based on the pointing position and the detected amount of position variation; and displaying a modified page.

In accordance with another aspect of the present invention, an apparatus for displaying an electronic book (e-book) in a terminal including an e-book reader is provided. The apparatus includes a display unit for displaying a page of the e-book; an input unit for receiving information about an input of a pointer with respect to an opened page; and a controller for detecting a pointing position indicated by a pointer and an amount of position variation, for modifying the opened page based on the pointing position and the detected amount of position variation, and for controlling such that a modified page is displayed.

BRIEF DESCRIPTION OF THE DRAWINGS

The above and other aspects, features, and advantages of the present invention will be more apparent from the following detailed description in conjunction with the accompanying drawings, in which:

FIG. 3 illustrates a page mesh according to an embodiment of the present invention;

FIG. 11 illustrates a shadow effect of a page according to an embodiment of the present invention.

DETAILED DESCRIPTION OF EMBODIMENTS OF THE INVENTION

Figure 1:
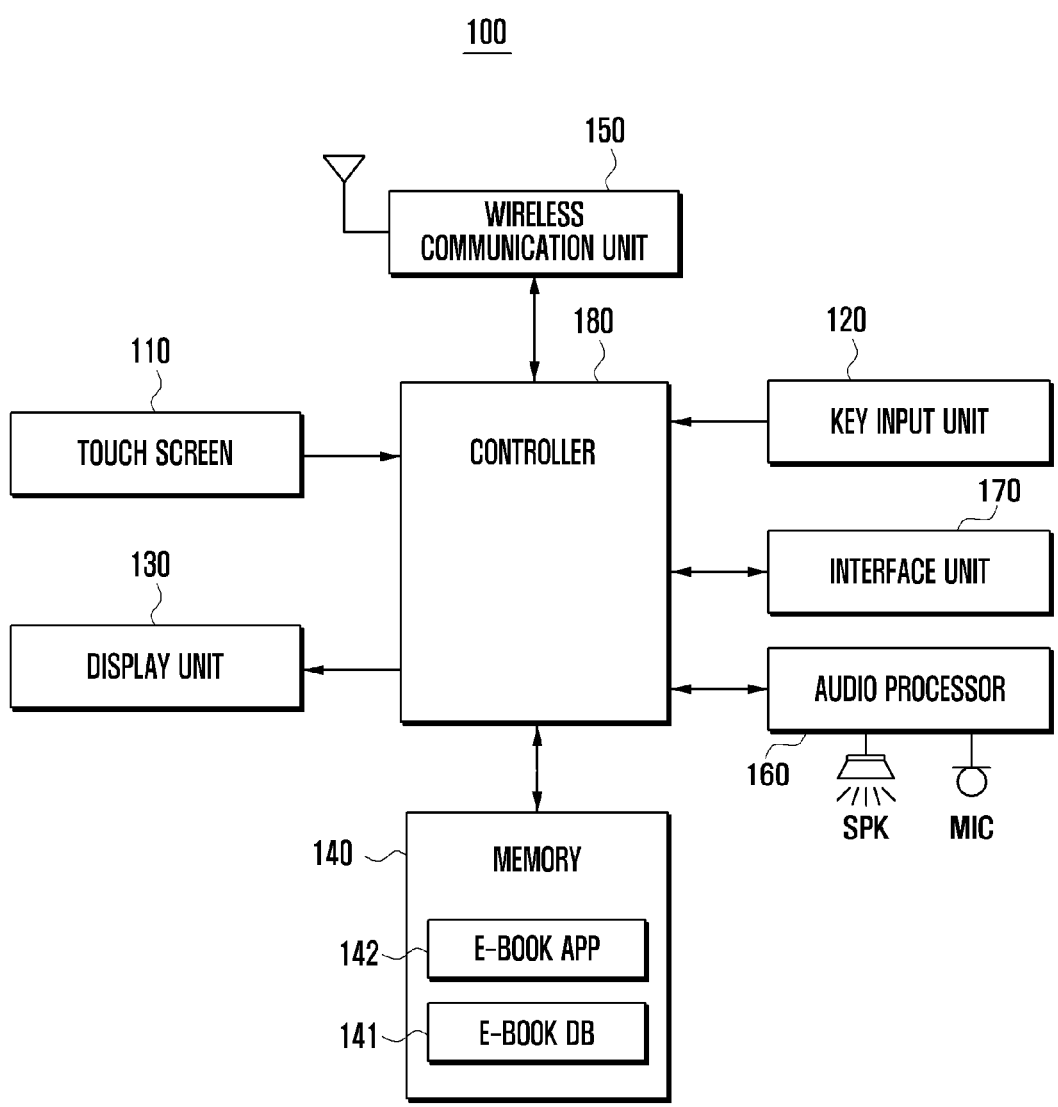
FIG. 1 is a block diagram illustrating a portable terminal according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

As used herein, the term "bookshelf" is defined as space in which a reading item is placed. Such a bookshelf may be displayed in various forms such as a folder, a form of a bookcase and the like. The reading item ("item") put on the bookshelf may be an e-book, a folder denoted as an image related to a shelf of multiple e-books, reading schedule information about e-books and an accessory for decorating the bookshelf, etc.

As used herein, "representation" is a shape of an e-book that allows a user to feel as if the user is manipulating a real paper book. A representation includes an interaction representation in one aspect of interaction with a user and a rendering representation in another aspect of rendering. For example, the interaction representation includes images of turning a page, a shadow when turning a page, folded page, unfolding a folded page, and tearing a page. The rendering representation includes images of a cover of an e-book looks old including discoloration and dust collected around an e-book.

As used herein, "rendering" is a function of processing related data to display images of an e-book or a bookshelf through a display and transferring it to the display. Particularly, in the present invention, rendering is a function of reflecting the rendering representation on the displayed image. In other words, reflecting is a function of processing an image to allow a user to feel as if he is manipulating a real paper book. In the present invention, "animation" is defined as a function of reflecting the interaction representation on the displayed image.

As used herein, "page mesh" is a mesh corresponding to a page. The page mesh includes links of connecting plural nodes to one another. A node corresponds to coordinates of a page. Suitable mass values are assigned to nodes and elastic values are assigned to links (springs), respectively. Large mass values are assigned to nodes located an inner area of a page. Small mass values are assigned to nodes located in a relatively outer area because a variation of location in the inner area is greater than that in the outer area. Forces acting on each node are divided into two types. One is inner force such as elastic force by a link connected to each node. And, the other is outer force such as force of directly pulling nodes by a user. Thus, all force, as the result of adding the inner force and the outer force, is acting on each node. That is, when the outer force is applied to a page, a form of a mesh is varied such that the page is modified as the mesh is reflected on the page and the modified page is displayed. A procedure of obtaining a result of modifying the page mesh is defined as a physically-based simulation. Further, the modified page by reflecting this page mesh is defined as the interaction representation.

As used herein, "pointer" is a means for indicating a position in a displayed page. Typically, in a terminal having a touchscreen, the pointer is an input means (for example, a finger or a pen). That is, the touchscreen receives input information from the touch input means and transfers it to a controller.

A method and an apparatus for displaying an e-book according to the present invention are applied to various types of electronic devices having a function of an e-book reader. Particularly, a method and an apparatus for displaying an e-book according to the present invention may be applied to a portable terminal having a touchscreen as an input. A portable terminal includes a mobile phone, a smart phone, a tablet PC, a hand-held PC, a Portable Multimedia Player (PMP), etc. Hereinafter, it is assumed that a method and an apparatus for displaying an e-book according to the present invention are applied to a portable terminal.

A method and an apparatus for displaying an e-book according to the present invention detect user input information and provide a technique of reflecting a representation on a page in response to detected input information. This technique of reflecting the representation will be described in detail below. Detailed descriptions of well-known functions and structures incorporated herein may be omitted to avoid obscuring the subject matter of the present invention.

FIG. 1 is a block diagram illustrating a configuration of a portable terminal according to an embodiment of the present invention.

Referring to FIG. 1, a portable terminal 100 according to the present invention a touchscreen 110, a key input unit 120, a display unit 130, a memory 140, a Radio Frequency (RF) communication unit 150, an audio processor 160, a speaker SPK, a microphone MIC, an interface unit 170, and a controller 180.

The touchscreen 110 is mounted on a front surface of the display unit 130, generates a touch event in response to a touch gesture by a user on the touchscreen 100, and transmits it to the controller 180. Thus, the controller 180 detects the touch event of the user input from the touchscreen 100 and controls the above elements. The user operation may be classified into touch, tap, double tap, press, drag, drag & drop, and sweep, and the like. The touch is an operation where a user pushes one point of a screen. The tap is an operation where a finger is removed from a corresponding point without movement of the finger after touching one point. The double tap is an operation where a user taps twice within a short period. The press is an operation where a finger is removed from a corresponding point without movement of the finger after touching it for a preset period of time longer than the tap. The drag is an operation that moves a finger in a direction after a point is touched. The drag & drop is an operation that removes a finger after drag. The sweep is an operation that escapes a finger after moving it by flipping at high speed. Here, the drag is called scroll and the sweep is called flick. The controller 180 distinguishes the sweep and the drag with each other at moving speed. Further, a resistive type, a capacitive type, and a pressure type are applicable as the touchscreen 110.

The key input unit 120 includes a plurality of input keys and function keys for receiving input of numerals and character information and for setting various functions. The function keys include arrow keys, side keys, and shortcut keys set such that a certain function is performed. Further, the key input unit 120 generates and transfers a key signal associated with function control of the portable terminal to the controller 180. The key signal is classified into a power on/off signal, a volume control signal, a screen on/off signal, and the like. The controller 180 controls the foregoing elements in response to the foregoing key signal. The key input unit 120 is implemented by a Qwerty keypad, a 3*4 keypad, a 4*3 keypad, or the like. Further, the key input unit 120 includes only at least one side key for screen on/off and portable terminal on/off which is provided in a side of a case of the portable terminal when a touchscreen 110 of the portable terminal is supported in a form of a full touchscreen.

The display unit 130 converts image data input from the controller 180 into an analog signal and displays the analog signal, under the control of the controller 180. That is, the display unit 130 provides various pictures, such as pictures of a lock, a home, an application ("App") execution, a keypad, message writing, the Internet, and the like, while using the portable terminal. The lock picture is defined as a picture displayed when a screen of the display unit 130 is powered on. When a specific touch event for unlocking occurs, the controller 180 changes a displaying picture from the lock picture to the home picture, the App execution picture and the like. The home picture is defined as a picture including plural App icons corresponding to plural Apps. When one of the plurality of App icons is selected by a user, the controller 180 executes a corresponding App for example, an e-book App, and change the displaying picture to its execution picture.

Specifically, the display unit 130 according to the present invention displays a representation under control of the controller 180. Specifically, the display unit 130 displays the interaction representation, such as images of turning a page, a shadow when turning a page, folded page, unfolding a folded page, and tearing a page. Further, the display unit 130 displays the rendering representation, such as images that a cover of an e-book looks old like discoloring, that dust is collected around an e-book, etc.

Further, the display unit 130 displays one of the pictures as a main picture, and display another picture as a sub-picture to overlap the main picture. For example, the display unit 130 displays an App execution picture that overlaps with a keypad picture. Further, the display unit 130 is formed in a type of a plate display panel such as a Liquid Crystal Display (LCD), an Organic Light Emitted Diode (OLED), an active matrix organic light emitted diode, etc.

The memory 140 stores various data as well as an Operating System (OS) of the portable terminal and an App necessary for the present invention. The memory 140 may largely include a data region and a program region.

The memory 140 stores data generated in the portable terminal 100 or downloaded from an external while the portable terminal 100 is used, that are an e-book, contact information, an image, a document, a video, a message, a mail, an audio file and the like, in the data region. The pictures displayed by the display unit 130 are stored in the data region. A keypad picture and a menu picture among those pictures may have various forms. That is, the keypad picture includes 3*4 and Qwerty types. Further, the main picture includes a picture changing key (for example, a return key for returning to a previous picture, and the like) and a control key for controlling a currently executing App. Further, data copied from a user message, a picture, a webpage, a document for a pasting function and the like is temporarily stored in the data region. Further, various setting values (e.g., screen brightness, turning vibration on or off by a touch, turning picture automatic rotation on or off, and the like) for operating the portable terminal is stored in the data region.

Further, an e-book DataBase (DB) 141 is stored in the data region. Information about reading states with respect to each of the plurality of stored e-books is stored in the data region. The reading state includes a date when the e-book stored, the number of times the e-book has been read, pages of the e-book which have been read, a date on which the e-book has been read, pages of the e-book which have not been read, and user input information. User input information is information individually input to a page by a user. The user input information is displayed at the same time when a corresponding page is displayed. For example, the user input information includes a memo, a highlight, an image, a bookmark, folded page information, torn page information.

An OS for booting the portable terminal and operating the above elements, and various Apps are stored in the program region of the memory 140. Specifically, a web browser for accessing the Internet, an MP3 player for reproducing audio, a camera application and the like are stored in the program region. Specifically, an e-book App 142 having a representation reflecting technique is stored in the program region according to the present invention.

The RF communication unit 150 performs a voice call, a video call, or a data communication under control of the controller 180. To accomplish this, the RF communication unit 150 includes a radio frequency transmitting unit for up-converting a frequency of a transmitting signal and amplifying the transmitting signal, and a radio frequency receiving unit. Further, the RF communication unit 150 includes a mobile communication module (for example, 3-generation mobile communication module, 3.5-generation mobile communication module, or 4-generation mobile communication module, and the like), a local area communication module (for example, a Wireless Fidelity (Wi-Fi) module), and a digital broadcasting module (for example, a Digital Multimedia Broadcasting (DMB) module).

The audio processor 160 performs a function of transferring an audio signal input from the controller 180 to the speaker SPK and transferring an audio signal, such as a voice inputted from the microphone MIC, to the controller 180. That is, the audio processor 160 converts voice/audio data into an audible sound and outputs it to the speaker SPK, under the control of the controller 180, and converts an audio signal, such as a voice sound received from the microphone MIC, into a digital signal and transfers it to the controller 180.

The interface unit 170 performs a function of connecting the portable terminal 100 through a wire or a wireless to an external apparatus. The interface unit 170 includes a Zigbee module, a Wi-Fi module, a Bluetooth® module and the like. Specifically, in the present invention, the interface unit 170 receives an e-book from an external apparatus and transfer it to the controller 180.

The controller 180 performs functions of controlling all operations of the portable terminal 100 and signal flow between internal elements of the portable terminal 100, and processing data. The controller 180 controls a power supply from a battery to the internal elements. Further, the controller 180 executes various applications stored in the program region. Specifically, the controller 180 includes an e-book application unit as illustrated in FIG. 2.

Figure 2:
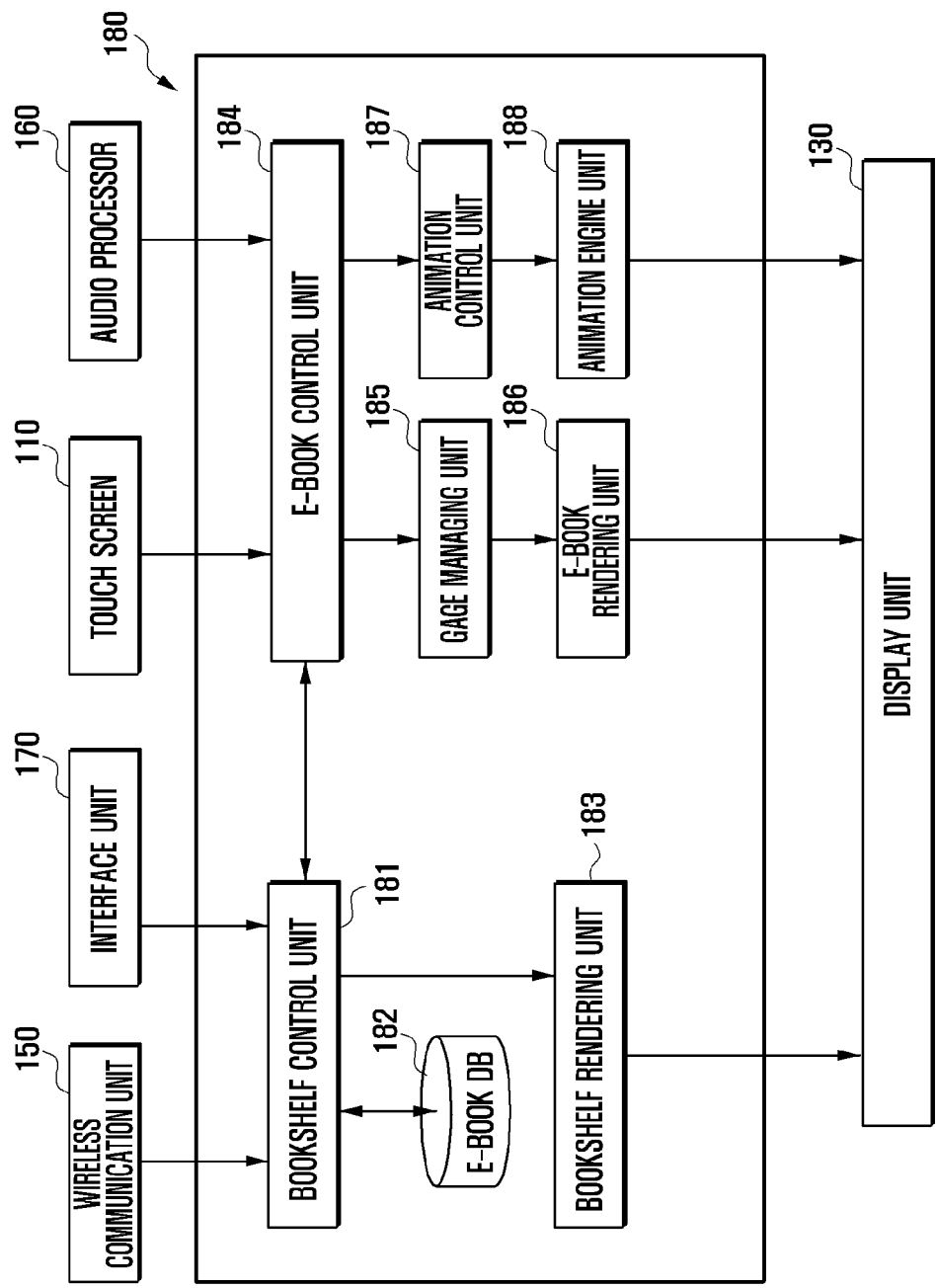
FIG. 2 is a block diagram illustrating an e-book application unit according to an embodiment of the present invention.

FIG. 2 is a block diagram illustrating an e-book application unit according to an embodiment of the present invention. The e-book application unit is configured in the controller 180 or individually. In description below, it is assumed that the e-book application unit is configured in the controller 180.

Referring to FIG. 2, the controller 180, that is the e-book application unit according to an embodiment of the present invention a bookshelf control unit 181, an e-book DB 182, a bookshelf-rendering unit 183, an e-book control unit 184, a page managing unit 185, an e-book rendering unit 186, an animation control unit 187, and an animation engine unit 188. The e-book DB 182 is included in the memory 140. Hereinafter, we assume that the e-book DB 182 is included in the controller 180.

The bookshelf control unit 181 is connected to the wireless communication unit 150 and the interface unit 170. The bookshelf control unit 181 stores the e-book received from them to the e-book DB 182. Further, the bookshelf control unit 181 provides information about an e-book to the e-book control unit 184, and provides information about a bookshelf to the bookshelf-rendering unit 183. The plurality of e-books and reading state information about each of them is stored in the e-book DB 182. As described above, the reading state information contains information about a date when the e-book has been stored, the number of times by which the e-book has been read, pages of the e-book which have been read, read dates and pages of the e-book which have not been read, and user input information.

The bookshelf-rendering unit 183 performs a function of rendering information about a bookshelf and transferring it to the display unit 130 under control of the controller 181. Thus, the display unit 130 displays an image of the bookshelf. Specifically, the bookshelf-rendering unit 183 renders the bookshelf to reflect a rendering representation on the bookshelf. Specifically, the bookshelf-rendering unit 183 renders an e-book that has been read a certain number of times is made to look old, with reference to a reading state transferred from the bookshelf control unit 181. For example, the bookshelf-rendering unit 183 expresses a cover of the e-book as if the cover of the e-book looks old like discoloring. Further, the bookshelf-rendering unit 183 produces an effect as dust is collected around the cover of the e-book.

The e-book control part 184 is connected to the touchscreen 110 and the audio processor 160. The e-book control part 184 receives input information about reading from the touchscreen 110. The information input from the touchscreen 110 is various touch gestures. Further, the e-book control unit 184 receives input information about reading through the audio processor 160 from the microphone MIC. The information input from the microphone MIC is information about strength and a continuous time period of wind. The e-book control unit 184 is detect a touch gesture, the strength of wind, the continuous time period of wind and the like, and in response to it, control such that an interaction representation is reflected on a page. Further, the e-book control unit 184 receives the e-book from the bookshelf control unit 181 and metadata (that is, a current state of reading and the like) related to it. The page managing unit 185 performs a function of generating a page, that is an image (snapshot) to be displayed on the display unit 130 based on information about an e-book received from the e-book control unit 184 under of the e-book control unit 184.

The e-book rendering unit 186 renders an image received from a page managing unit 185 and transferring it to the display unit 130 under of the e-book control unit 184. Specifically, the e-book rendering unit 186 renders a page to reflect a rendering representation on the page. Specifically, the e-book rendering unit 186 performs rendering to distinguish unread pages from pages which have been read with reference to information about a current reading state transferred from the e-book control unit 184. For example, the more the read a page is, the e-book rendering part 186 shows the page to be darker. Further, the e-book rendering part 186 represents an effect that an edge portion has been worn.

The animation control unit 187 receives user input information from the e-book control unit 184. The animation control unit 187 then controls the animation engine unit 188 based on the received user input information. The animation engine unit 188 performs a physical-based simulation to calculate an interaction representation, and performs a function of reflecting the calculated interaction representation on an image. That is, the animation engine unit 188 controls the display unit 130 to produce the interaction representation such as images of turning a page, a shadow when turning a page, folded page, unfolding a folded page, tearing a page and the like.

FIG. 3 illustrates an example of a page mesh according to an embodiment of the present invention.

Referring to (a) of FIG. 3, the controller 180, the animation engine unit 188 constructs a page mesh. The page mesh includes the plurality of nodes 310 and links 320, which connects them to one another. As shown, the plurality of nodes 310 are arranged into matrix form and are denoted as x-y coordinates. Further, as described above, mass values are assigned to each of the plurality of nodes and suitable elastic values are assigned to each link (spring). Large mass values are assigned to nodes located at the center 330 of an e-book. Mass values assigned to nodes located at an outer portion apart from the center 330 are less than them of nodes at an inner portion. Further, as described above, the force applied to each node is divided into internal force and external force. When the external force is applied to a page, the form of a mesh is varied.

Specifically, referring to (b) of FIG. 3, when after touching a point 340 by touch input means (for example, a finger, a pen and the like), a user allows the touch input means to move in a direction, the touched node 340 moves along the touch input means. That is, a position of the touched node 340 varies based on a position variation of the touch input means. The position variation is a moving direction of the touch input means, a moving distance or a combination of them. Other nodes that are connected to the touched node 340 move in a chain, and the whole form of the page mesh is varied. That is, the animation engine unit 188 detects the first touched position and position variation, modifies the page mesh based on the detected information, and reflects the modified page mesh on the page. As mentioned above, the page mesh is modified in various ways based on the touch position and the touch position variation. That is, when the user drags a page in a state where the user maintains a touch on the page, the page mesh is continuously modified according to the touch position and the position variation. Thus, the user can experience page movement from the e-book as if he holds and shakes a real paper.

The portable terminal 100 also includes elements such as a camera module for photographing a still picture/moving picture of an object according to its providing type, a sensor module for detecting information about a position variation of the portable terminal, a GPS module and the like. However, since there are many types of elements mentioned above, they all cannot be described. Moreover, the portable terminal may further include elements similar to the above-mentioned elements. Of course, a specific element in the above structure may be excluded from the portable terminal 100 of the present invention or replaced with another element. This will be apparent to those skilled in the art. Further, in the present invention, it will be apparent that the input unit includes not only the touchscreen 110 and the key input unit 120, but also a writing pen, a mouse, a touch pad, a trackball and the like.

Figure 4:
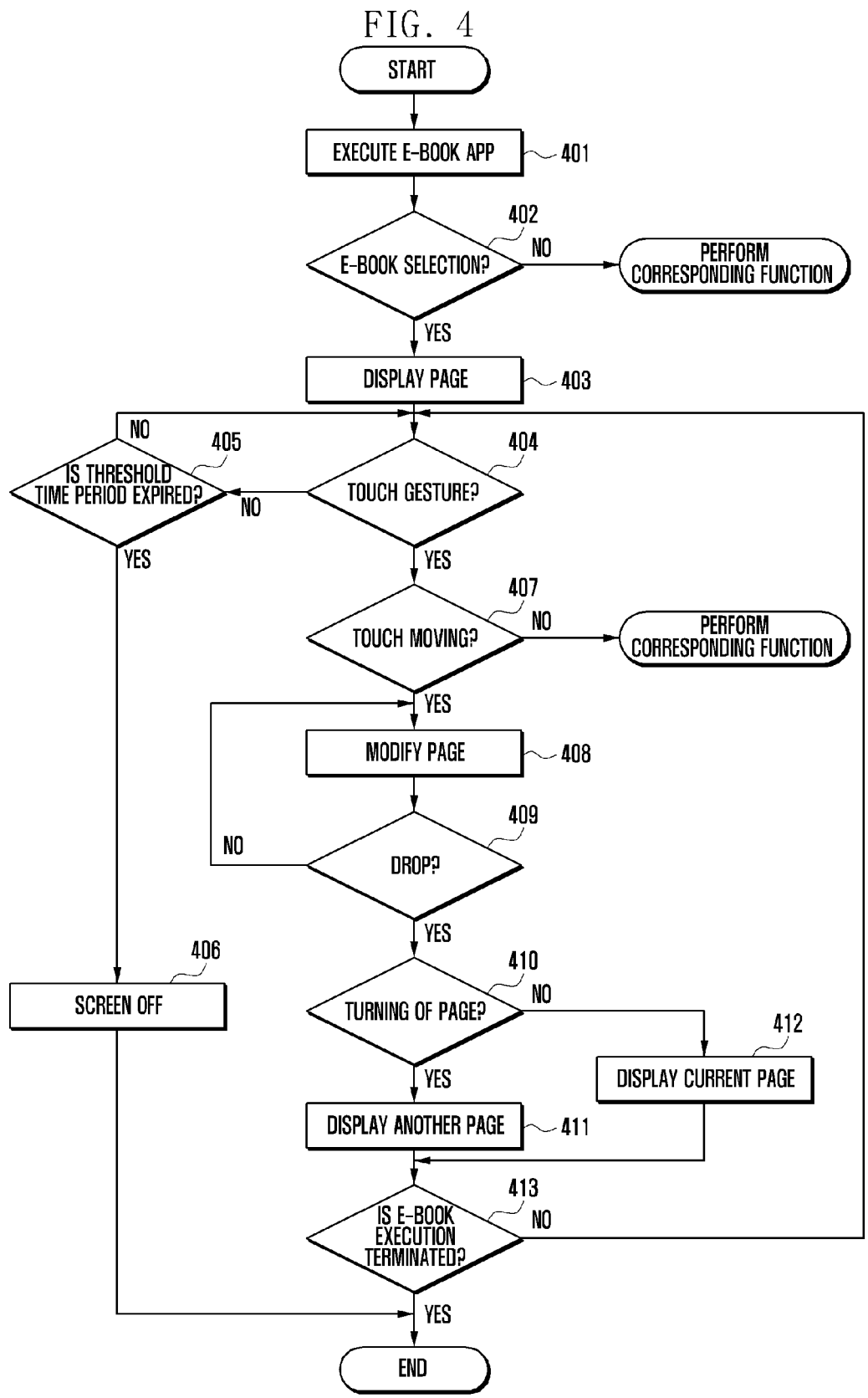
FIG. 4 is a flowchart illustrating a method of displaying an e-book according to an embodiment of the present invention.

FIG. 4 is a flowchart illustrating a method of displaying an e-book according to an embodiment of the present invention.

Referring to FIG. 4, the controller 180 is first in a standby state. For example, the controller 180 is in a state where the controller 180 controls such that a home picture including an icon for executing an e-book App is displayed. In standby state, when a touch gesture related to a request for executing an e-book App is detected, the controller 180 controls such that a bookshelf is displayed by executing the e-book App in step 401. When the controller 180 detects a gesture of selecting an icon of one e-book among the plurality of e-books while displaying the bookshelf in step 402, the controller 180 controls such that a page of the selected e-book is read from a database and displayed in step 403. Meanwhile, when a touch gesture related not to the e-book selection, but to any other function, for example a request for executing a bookshelf editing function is detected, the corresponding function is executed.

The controller 180 determines whether a touch gesture occurs while displaying the page of the e-book in step 404. When it is determined that the touch gesture does not occur, the process goes to step 405. The controller 180 determines whether a threshold time period is elapsed in step 405. The threshold time period is defined as a value set for automatically turning off a screen. For example, when the controller 180 does not detect any touch event until the threshold time period is elapsed after controlling such that the page of the e-book is displayed, it turns off the screen in step 406.

When a user manipulates the touchscreen 110 in a state where a page of the e-book is displayed, the controller 180 detects a touch gesture. When the controller 180 detects the touch gesture at the step 404, the controller 180 determines whether the detected touch gesture is related to a touch movement such as a drag, a flick and the like in step 407. As the determination result, when the detected touch gesture is not related to the touch movement but for example, a request for displaying the bookshelf, the controller 180 performs a corresponding function. To the contrary, when it is related to the touch movement, the controller 180 detects a touch position and a position variation in response to the touch gesture related to the touch movement, modifies a page mesh based on the detected information and reflects the modified page mesh on a page.

In a state in which the page is modified, the controller 180 determines whether release of the touch gesture, i.e., a drop, occurs. As the determination result, when the touch gesture is maintained, the process goes to step 408. When the drop occurs, the process goes to step 410. At step 410, the controller 180 determines whether the drop corresponds to the turning of a page. That is, the controller 180 determines whether the turning of a page occurs, based on a direction of the touch gesture before the occurrence of the drop. As the determination result, when it is the turning of a page, the controller 180 controls such that the turning of a page is performed and another page is displayed in step 411. However, when it is not the turning of a page, the controller 180 maintains a current page in step 412. That is, the controller 180 restores the modified page to the original page in step 412. The controller 180 then determines whether it is terminated to execute the e-book in step 413. As the determination result, when it is not terminated to execute the e-book, the process returns to the step 404.

When the user touches the current displaying page and falls off from it by touch input means, the page is turned or not. This is determined by a touch moving direction just before the touch input means falls off from the screen (i.e., a page). A detailed embodiment will be described with reference to FIG. 5.

Figure 5:
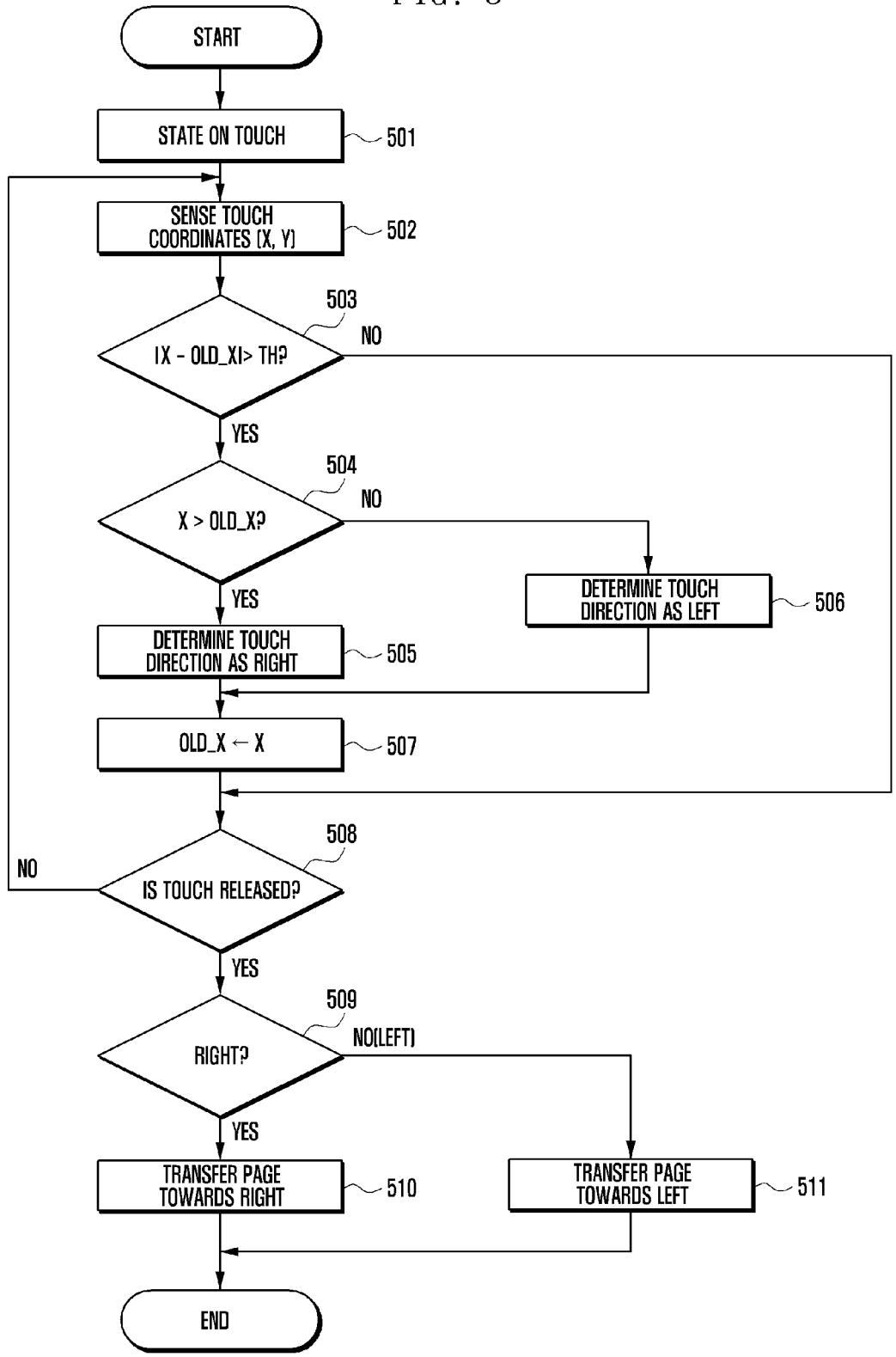
FIG. 5 is a flowchart illustrating a method of turning a page according to an embodiment of the present invention.

FIG. 5 is a flowchart illustrating a method of turning a page according to an embodiment of the present invention.

Referring to FIG. 5, the display unit 130 displays a page and the displayed page is touched by touch input means of a user in step 501. While the touch input means touches the page, the controller 180 detects a coordinate (x, y) of a currently touching position in step 502. It is assumed that x-axis is a horizontal axis with respect to a viewpoint of a user. It is assumed that two pages are displayed at left and right sides with respect to the central line of a screen, respectively. Further, we assume that a right side of the central line is a positive direction of the x-axis and a left side of the central line is a negative direction of the x-axis. Under the assumption above, the controller 180 determines whether a value (x−old_x) satisfies Equation (1).

$$|x-\text{old}\_x|>th \quad (1)$$

In Equation (1), "x" denotes an x coordinate of a currently touching point, "old_x" denotes an x coordinate of a previously touched point, and "th" denotes a predetermined threshold value in step 503. If the equation is not satisfied, the process goes to step 508. However, if the equation is satisfied (i.e., a difference between the currently touching point and the previously touching point exceeds the predetermined threshold value), the process goes to step 504.

The controller 180 determines whether the x-coordinate of the currently touching point is greater than that of the previously touching point in step 504. As the determination result, if the x-coordinate of the currently touching point is greater than that of the previously touching point, the controller 180 determines that the touch direction is right in step 505. However, if the x-coordinate of the currently touching point is not greater than that of the previously touching point, the controller 180 determines that the touch direction is left in step 506. The controller 180 then sets the x-coordinate of the previously touching point into the x-coordinate of the currently touching point in step 507. The controller 180 then determines whether the touch is released in step 508. As the determination result, when the touch is not released, the process returns to the step 502. However, when the touch is released, the controller 180 determines whether the touching direction is right or left in step 509. If the touch direction is to the right, the controller 180 makes the touched page move in the right direction in step 510. If the touched page is the left page, the step 510 corresponds to an operation of turning a page to a previous page. On the contrary, if the touched page is a right page, the step 510 corresponds to an operation of not turning a page to a next page, but maintaining the display of the touched page. As the determination result, if the touched direction is left, the controller transfers the touched page into the left in step 511. If the touched page is the left page, the step 511 corresponds to an operation of maintaining the display of the touched page without turning of a page to a next page. However, if the touched page is a right page, the step 511 corresponds to an operation of turning a page to a next page.

Figure 6:
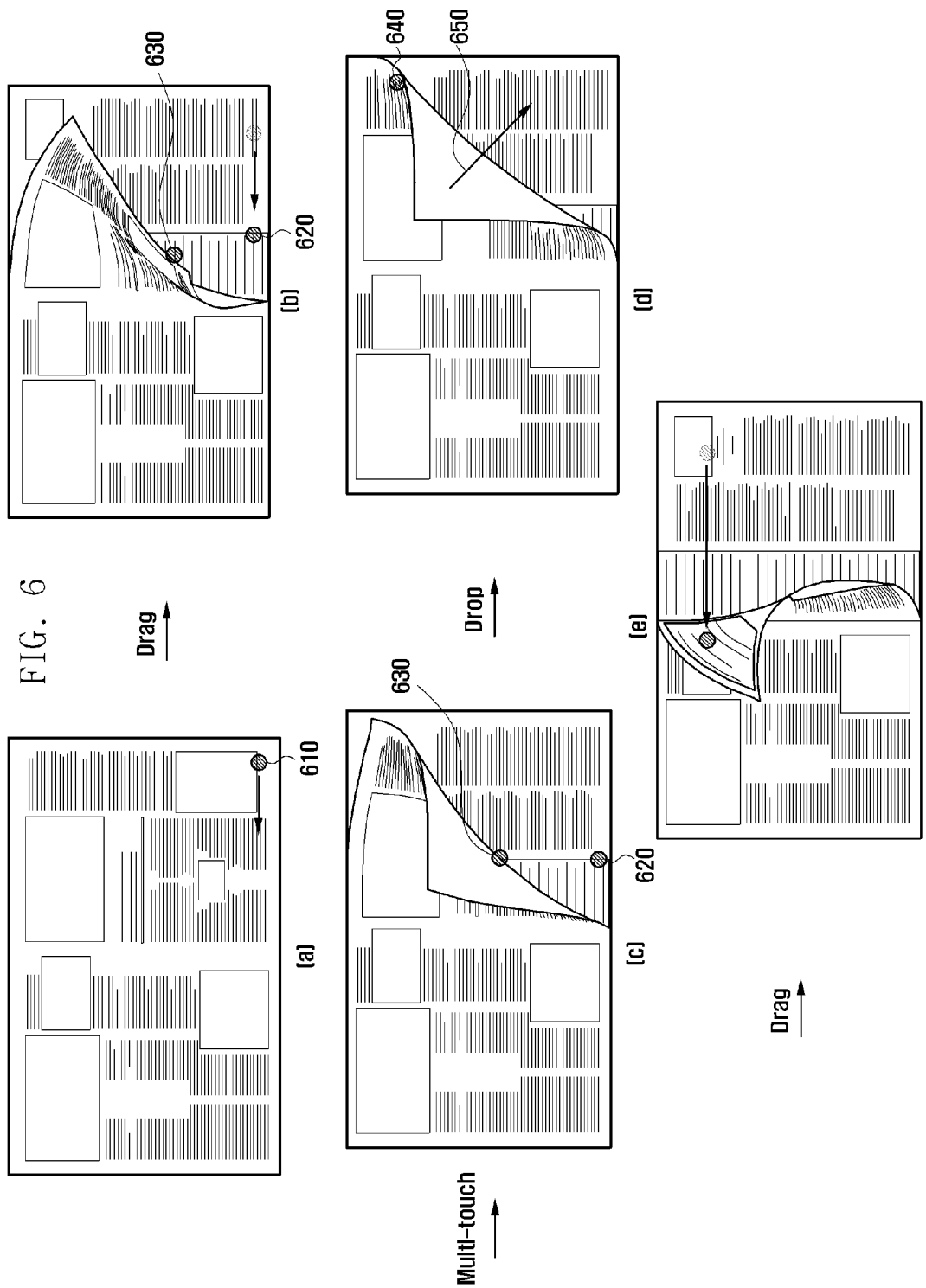
FIG. 6 illustrates a procedure of folding a page according to an embodiment of the present invention.

FIG. 6 illustrates a procedure of folding a page according to an embodiment of the present invention.

First, referring to (a) of FIG. 6, the display unit 130 displays two pages on the left and right sides of the screen under control of the controller 180. In this state, when a user starts to perform a drag from the first point 610, the controller 180 detects position variation by the drag. Then, referring to (b) of FIG. 6, the controller 180 modifies a page mesh based on the detected position variation, reflects the modified page mesh on the touched page to modify the page, and controls the display unit 130 to display the modified page. When the user touches the third point 630 in the modified page in a state that the user maintains touching of the second point 620, the controller 180 detects multiple touches.

Referring to (c) of FIG. 6, when the controller 180 detects the multiple touches, the controller 180 controls the display unit 130 to display the folded and modified page. Then, referring to (d) of FIG. 6, when the controller 180 detects the release of the multi-touch, the controller 180 controls the display unit 130 to display the page in the folded state. Then, referring to (d) and (e) of FIG. 6, when the user performs a drag from the fourth point 640, the controller 180 modifies the page in the folded state. Meanwhile, referring to (d) of FIG. 6 again, when the controller 180 detects a drag in an unfolding direction with respect to the folded page, the controller 180 allows a folded portion to be unfolded such that the original unfolded page is displayed.

When the user turns a page with one finger of the user, and, at the same time, the user touches a folded portion, that is the third point 630 with another finger, the controller 180 modifies the page mesh to fold a folded portion. Portions of other pages corresponding to the folded portion is projected and displayed. That is, portions of other pages are shown through the folded portion to a user.

Further, when the user turns a page, the page is folded as much as the user desires according to a folded degree. Such a folded page is freely controlled in the folded state. If in a state that the user presses the folded portion with his one finger, the user pushes the folded portion in an original edge direction, that is, as illustrated above, in an unfolding direction with respect to the folded page, the controller 180 detects the touch gesture and restores the folded portion to its former state.

Further, the folded portion is used as a bookmark. That is, the function of folding a page or restoring a folded portion is linked with a function of adding or deleting a corresponding page to or from a bookmark list.

Further, the controller 180 provides the user with a method that allows the user to recognize easily and intuitively a page including user input information, such as a memo, a highlight, an image, a bookmark, folded page information, torn page information, lastly read page information, and the like. For example, the display unit 130 displays a side of a book in three dimensions to allow the user to recognize a thickness of the book under control of controller 180. The controller 180 distinguishes a page including the user input information from a page having no user input information. That is, the display unit 130 displays the page including the user input information to be kept at a suitable distance from a neighbor page and float on it, or with a specific color distinguished from that of the neighbor page. Thus, the user can easily recognize where the page including the user input page is located, through a side of an opened book. Further, when the side of the book is touched by the user, the controller 180 controls such that the page including the user input information is displayed.

Figure 7:
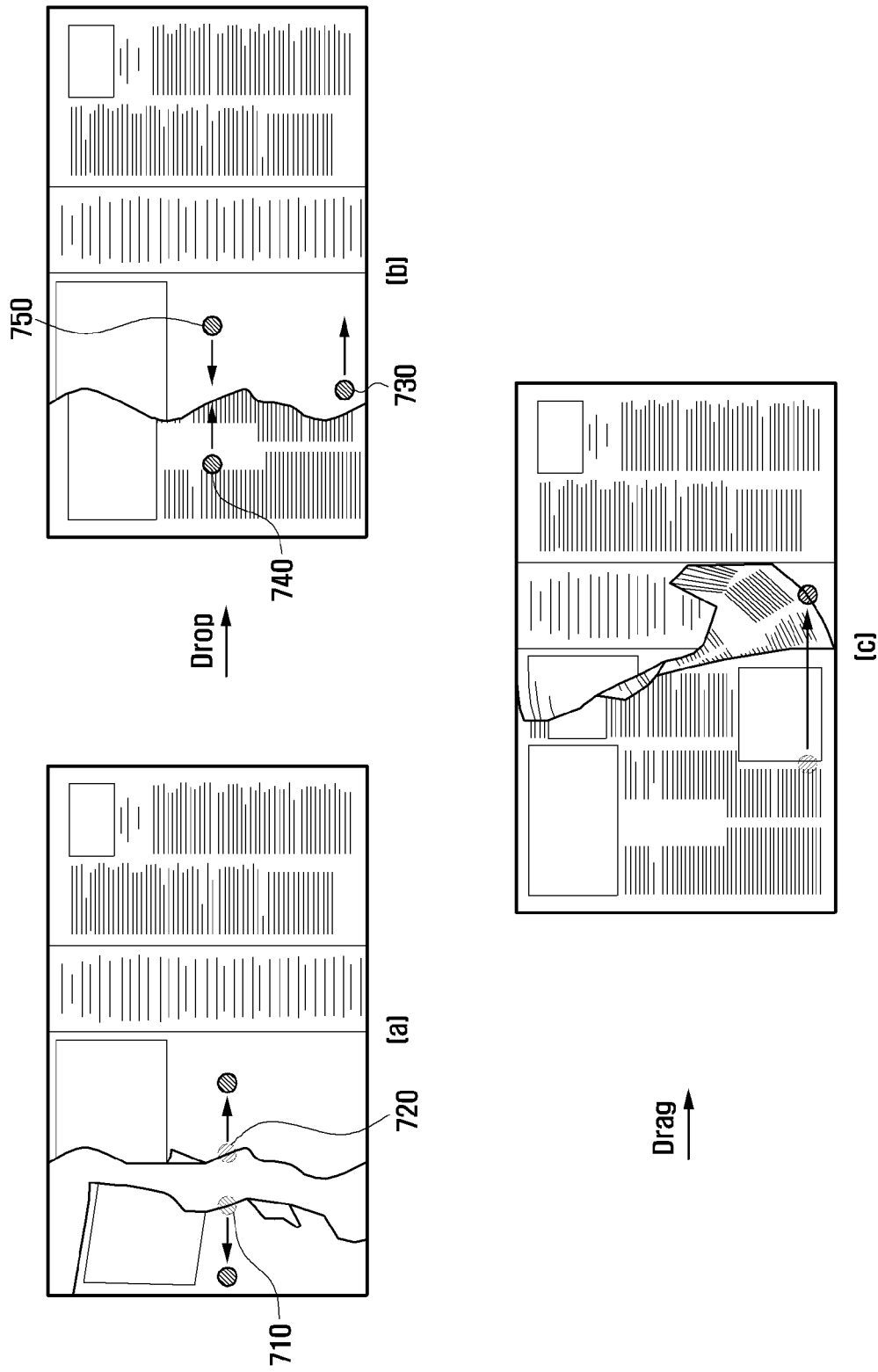
FIG. 7 illustrates a procedure of tearing a page according to an embodiment of the present invention.

FIG. 7 illustrates a procedure of tearing a page according to an embodiment of the present invention.

Referring to (a) of FIG. 7, when a user spreads two of his fingers in a state in which the two fingers are touched to the first and second points 710 and 720 as if tearing a page, the controller 180 detects this touch gesture. The controller 180 then controls the display unit 130 to display the procedure of tearing the paper. If a distance between two fingers exceeds a predetermined threshold value, a portion corresponding to the first point 710 in the corresponding page is entirely separated from the e-book.

Referring to (b) of FIG. 7, when the multi-touch is released, the controller 180 controls the display unit 130 such that the separated portion from the e-book disappears.

Referring to (c) of FIG. 7, when the user performs a drag from the third point 730 in the remaining portion except for the torn portion, the controller 180 modifies the remaining portion.

Referring to (b) of FIG. 7, in a state that the user touches the fourth point 740 and the fifth point 750 with his two fingers, when the user closes the fingers together, the controller 180 controls such that a restoring procedure of combining the torn portion with the remaining portion is displayed. Further, the remaining portion is folded by the above-mentioned folding procedure. Of course, a folded page is torn by the above-mentioned tearing procedure.

Figure 8:
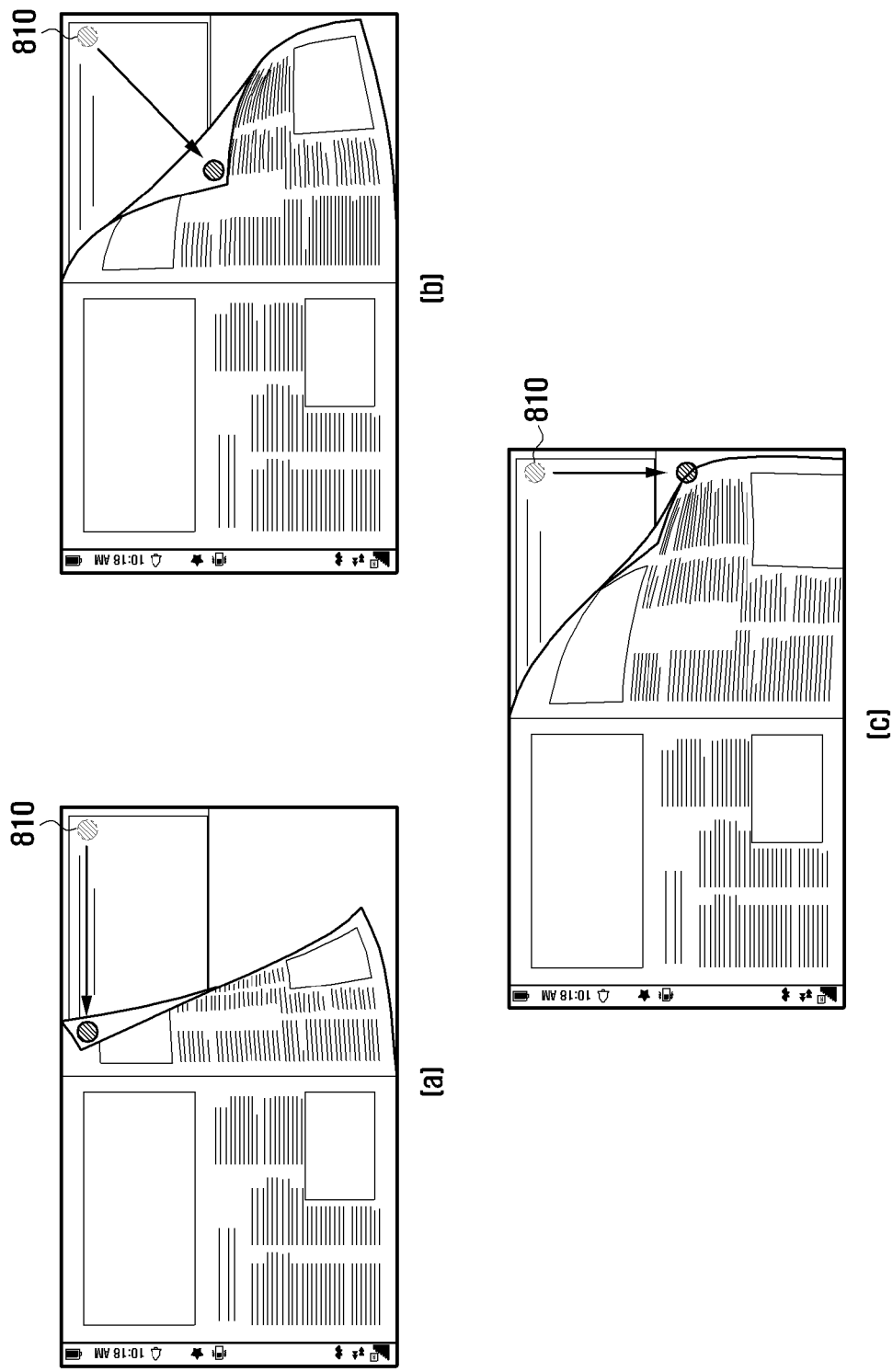
FIG. 8 illustrates a procedure of modifying a page according to an embodiment of the present invention.

FIG. 8 illustrates a procedure of modifying a page according to an embodiment of the present invention.

As described above, the controller 180 according to the present invention detects a touch position and a position variation, and modifies a page mesh to reflect it on a page based on the detected information. Thus, the page is modified in various ways according to a moving direction of the touch.

First, referring to (a) of FIG. 8, when a user drags towards the left in a state that the user touches a point 810 in a right upper edge portion, a page is modified in the form of turning the page towards left. Referring to (b) of FIG. 8, when a user drags in a diagonal direction in a state in which the user touches the point 810, a page is modified in a form of turning the page in the diagonal direction. Referring to (c) of FIG. 8, when a user drags downwardly in a state in which the user touches the point 810, a page is modified in the form of turning the page downwardly. As described above, although a user touches the same point 810, it is certain that an interaction representation (a page form) changes according to a moving direction of the touch. That is, the user has the feeling that he is manipulating a real paper book.

Figure 9:
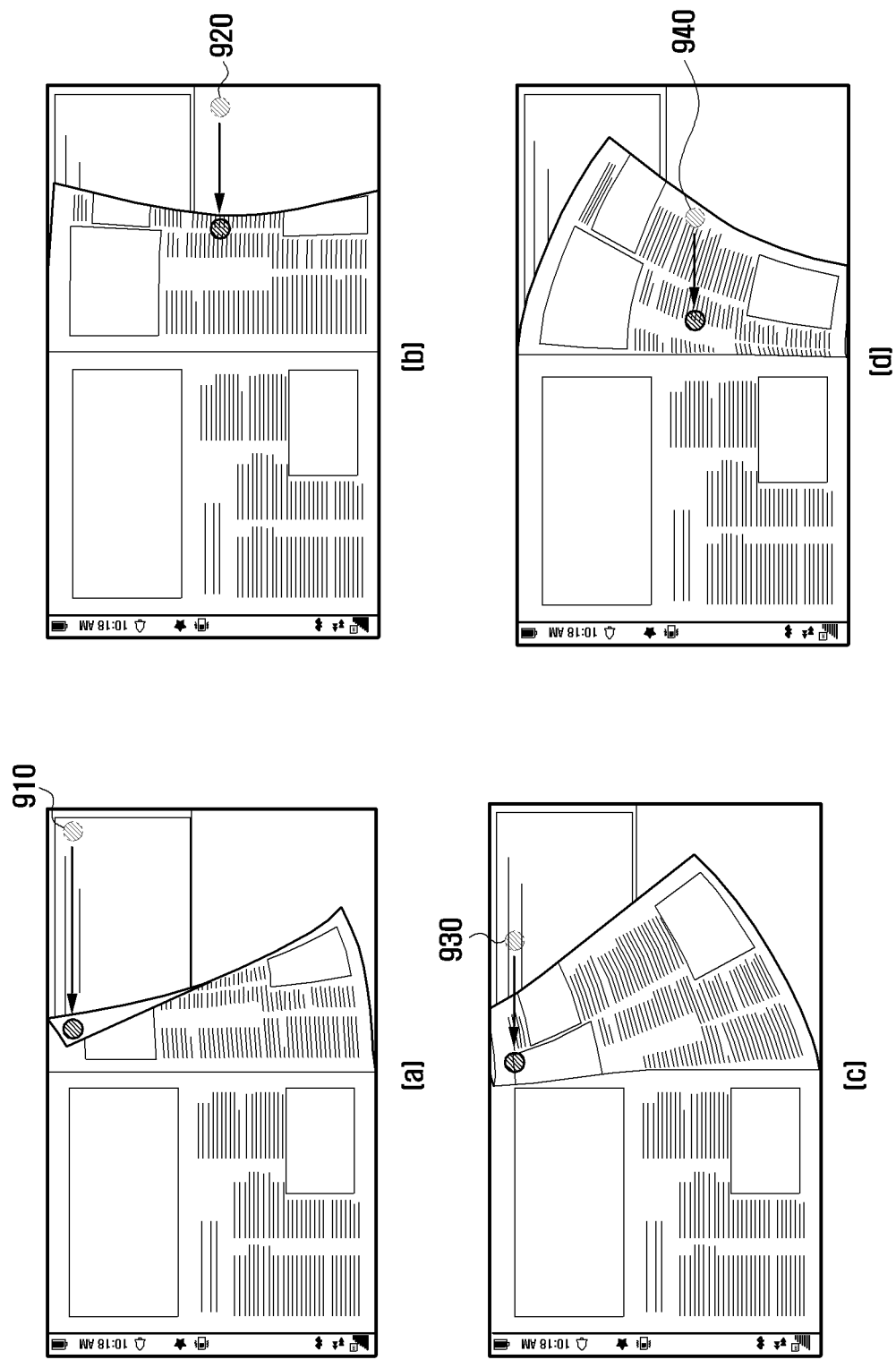
FIG. 9 illustrates a procedure of modifying a page according to another embodiment of the present invention.

FIG. 9 illustrates a procedure of modifying a page according to another embodiment of the present invention.

As described above, the controller 180 according to the present invention detects a touch position and a position variation, and modifies a page mesh to reflect it on a page based on the detected information.

First, referring to (a) of FIG. 9, when a user drags towards the left in a state that the user touches the first point 910 in a right upper edge portion, a page is modified by turning the page towards left. Referring to (b) of FIG. 9, when a user drags towards left in a state that the user touches the second point 920 in a right central portion, a page is modified by turning the page from the second point 920 towards left. Referring to (c) of FIG. 9, when a user drags towards left in a state that the user touches the third point 930 in a central portion of an upper edge, a page is modified by turning the page from the third point 930 towards left. Further, referring to (d) of FIG. 9, when a user drags towards the left in a state in which the user touches the fourth point 940 in a central portion, a page is modified by turning the page from the fourth point 940 towards left. As described above, the page is modified in various ways where the first touch point occurs.

Figure 10:
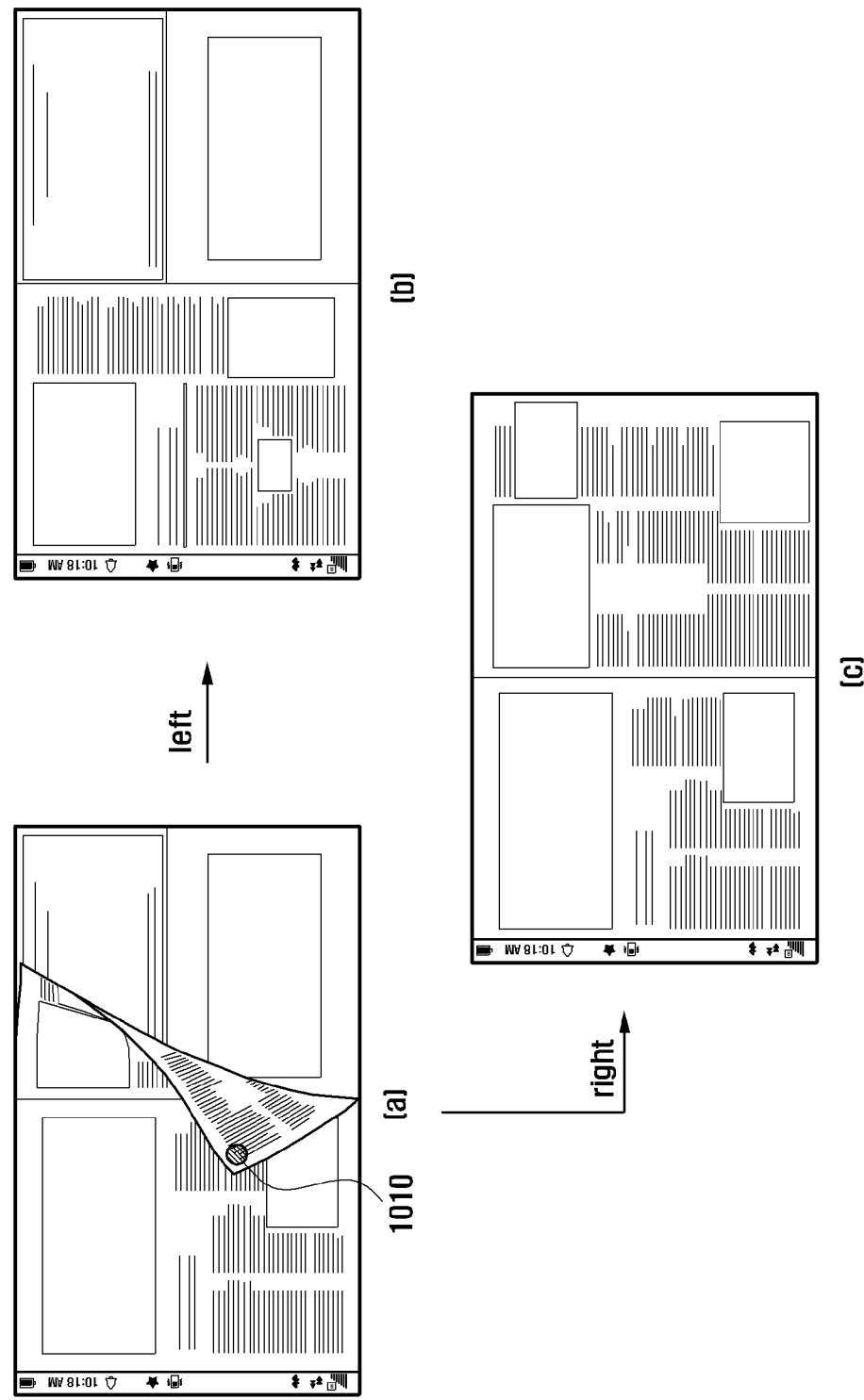
FIG. 10 illustrates a procedure of determining a moving direction of a page according to an embodiment of the present invention.

FIG. 10 illustrates a procedure of determining which direction a page moves in according to an embodiment of the present invention.

As described above, the controller 180 according to the present invention detects a drop when a user drops a page while dragging the page, the controller 180 makes the page move in a moving direction of the touch just before dropping the page.

First, FIG. 10 (*a*) shows a state that a user stops moving to a point 1010 while dragging a page. In this state, when the user drops, the page is turned towards the left, or returns to an original opened state without turning the page towards the left. That is, referring to (b) of FIG. 10, when the moving direction of the touch just before the drop is to the left, the page is turned toward the left. On the contrary, referring to (c) of FIG. 10, when the moving direction of the touch just before the drop is to the right, the page returns to the original opened state.

FIG. 11 illustrates a shadow effect of a page according to an embodiment of the present invention. The controller 180 according to the present invention gives a shadow effect to a folded portion of a page.

FIG. 11 (*a*) illustrates an example that a shadow effect is not applied, and FIG. 11 (*b*) illustrates an example that a shadow effect is applied. Specifically, to apply a shadow to a folded portion, the controller 180 calculates a perpendicular vector to each coordinate of a page, and calculates an angle between the perpendicular vector and a light source vector towards a light source. First, when the calculated value is less than a predetermined threshold value, the corresponding coordinates are regarded as if a user directly looks at the light source, such that the page is displayed in a bright manner. However, when the calculated value is greater than the predetermined threshold value, the corresponding coordinates are regarded as if light does not reach them, such that the page is displayed in a dark manner. It is regarded that the light source is located on a line perpendicular to the page. The controller 180 processes a degree of lightlessness step-by-step, as follows.

Where the controller 180 processes the corresponding coordinates rather darkly when the calculated value is greater than the first threshold value and less than the second threshold value, the corresponding coordinates are processed slightly more darkly when the calculated value is greater than the second threshold value.

According to a method and an apparatus for display an e-book of the present invention, there is provided an effect of giving a realistic feeling to a user when the user reads the e-book. Specifically, there is provided an effect of allowing a user to experience an operation of moving a page as in shaking a real paper book.

A method for recognizing an earphone according to an embodiment of the present invention as described above is implemented in an executable program command form by various computer means and be recorded in a computer readable recording medium. The computer readable recording medium includes a program command, a data file, and a data structure individually or a combination thereof. The program command recorded in a recording medium is specially designed or configured for the present invention or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may also be configured to be operated as a software module to perform an operation of the present invention.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method of displaying an electronic book (e-book) in a terminal including an e-book reader, the method comprising:
   displaying an opened page of the e-book;
   detecting a pointing position indicated by a pointer and an amount of position variation of the pointer over the opened page;
   modifying the opened page based on the pointing position and the detected amount of position variation; and
   displaying the modified page,
   wherein modifying the opened page comprises:
      configuring a page mesh corresponding to the opened page, wherein the page mesh includes a plurality of nodes and a plurality of links connecting the plurality of nodes to one another;
      modifying the page mesh by changing the position of the node of the plurality of nodes corresponding to the pointing position, and
      modifying the opened page by applying the modified page mesh to the opened page,
   wherein configuring the page mesh corresponding to the opened page comprises assigning mass values to each of the plurality of nodes and elastic values to each of the plurality of links, and
   wherein a mass value assigned to a node corresponding to an inner area of the page mesh is greater than a mass value assigned to a node corresponding to an outer area of the page mesh.

2. The method of claim 1, wherein the pointer comprises touch input means for touching a page, the touch input means being included in a terminal having a touchscreen.

3. The method of claim 2, further comprises folding the modified page when a multi-touch event with respect to the modified page is detected.

4. The method of claim 3, further comprising opening a folded portion.

5. The method of claim 2, wherein modifying the opened page comprises:
   detecting a multi-touch event with respect to the opened page; and
   tearing the opened page when touches of the detected multi-touch event move in a direction apart from one another.

6. The method of claim 5, wherein modifying the opened page further comprises restoring a torn portion.

7. The method of claim 1, further comprising, when a pointing release for the modified page is detected, transferring the modified page in a moving direction of the pointer just before the pointing release.

8. The method of claim 1, further comprising rendering and displaying the e-book based on information about a current reading state including at least one of a date when the e-book was stored, a number of times by which the e-book has been read, pages of the e-book which have been read and a date when the e-book was last read.

9. The method of claim 1, further comprising shading the modified page.

10. A method of displaying an electronic book (e-book) in a terminal including an e-book reader, the method comprising:
   displaying an opened page of the e-book;
   receiving information from a microphone included in the terminal, the information being related to at least one of a strength of wind and a continuous time period of the wind;
   modifying the opened page based on the information; and
   displaying the modified page.

11. An apparatus for displaying an electronic book (e-book) in a terminal including an e-book reader, the apparatus comprising:
   a display unit for displaying a page of the e-book;
   an input unit for receiving information about an input of a pointer over an opened page of the e-book; and
   a controller for detecting a pointing position indicated by a pointer and an amount of position variation, for modifying the opened page based on the pointing position and the detected amount of position variation, and for controlling such that the modified page is displayed,
   wherein modifying the opened page comprises configuring a page mesh corresponding to the opened page, wherein the page mesh includes a plurality of nodes and a plurality of links connecting the plurality of nodes to one another, modifying the page mesh by changing the position of the node of the plurality of nodes corresponding to the pointing position, and modifying the opened page by applying the modified page mesh to the opened page,
   wherein configuring the page mesh corresponding to the opened page comprises assigning mass values to each of the plurality of nodes and elastic values to each of the plurality of links, and
   wherein a mass value assigned to a node corresponding to an inner area of the page mesh is greater than a mass value assigned to a node corresponding to an outer area of the page mesh.

12. The apparatus of claim 11, wherein the input unit comprises a touchscreen.

13. The apparatus of claim 12, wherein the controller, when a multi-touch event with respect to the modified page is detected, controls the display unit to display the modified page in a folded state.

14. The apparatus of claim 13, wherein the controller controls the display unit such that a folded portion is opened.

15. The apparatus of claim 12, wherein the controller detects a multi-touch event with respect to the opened page, and when touches of the detected multi-touch event move in a direction apart from one another, controls the display unit such that the opened page is displayed in a torn state.

16. The apparatus of claim 15, wherein the controller controls the display unit such that a torn portion is restored.

17. The apparatus of claim 11, wherein the controller, when a pointing release for the modified page is detected, controls the display unit to transfer the modified page in a moving direction of the pointer just before the pointing release.

18. The apparatus of claim 11, wherein the controller comprises a rendering unit for rendering and displaying the e-book based on information about a current reading state including at least one of a storing date, a reading number, a read page and a read date of the e-book.

19. The apparatus of claim 11, wherein the controller shades the modified page.

20. An apparatus for displaying an electronic book (e-book) in a terminal including an e-book reader, the apparatus comprising:
a display unit for displaying a page of the e-book,
a microphone; and
a controller electronically connected to the display unit and the microphone,
wherein the controller is configured to:
receive information from the microphone, the information being related to at least one of a strength of wind and a continuous time period of the wind,
modify the opened page based on the information, and
control the display unit to display the modified page.

* * * * *